US012259005B2

(12) United States Patent
Lee

(10) Patent No.: US 12,259,005 B2
(45) Date of Patent: Mar. 25, 2025

(54) BALL SPLINE ASSEMBLY AND BALL REFLOW COMPONENT THEREOF

(71) Applicant: ChuanYu Lee, New Taipei (TW)

(72) Inventor: ChuanYu Lee, New Taipei (TW)

( * ) Notice: Subject to any disclaimer, the term of this patent is extended or adjusted under 35 U.S.C. 154(b) by 67 days.

(21) Appl. No.: 18/172,973

(22) Filed: Feb. 22, 2023

(65) Prior Publication Data

US 2024/0060533 A1 Feb. 22, 2024

(30) Foreign Application Priority Data

Aug. 16, 2022 (CN) .......................... 202222151545.5

(51) Int. Cl.
*F16C 29/06* (2006.01)
(52) U.S. Cl.
CPC .............................. *F16C 29/0695* (2013.01)
(58) Field of Classification Search
CPC F16C 29/068; F16C 29/0683; F16C 29/0685; F16C 29/0692; F16C 29/0695; F16C 29/084
See application file for complete search history.

(56) References Cited

U.S. PATENT DOCUMENTS

| 5,893,646 | A | * | 4/1999 | Mizutani | ............. | F16C 29/0688 |
| | | | | | | 384/43 |
| 6,190,046 | B1 | * | 2/2001 | Agari | .................... | F16C 29/084 |
| | | | | | | 384/43 |

FOREIGN PATENT DOCUMENTS

| CN | 201786929 U | * | 4/2011 | .......... F16C 29/0695 |
| CN | 214661523 U | | 11/2021 | |
| JP | 5570217 B2 | | 8/2014 | |
| TW | M613469 U | * | 6/2021 | |
| WO | WO-2009041176 A1 | * | 4/2009 | .......... F16C 29/0602 |
| WO | 2011048892 A1 | | 4/2011 | |

OTHER PUBLICATIONS

Machine Translation of WO 2009041176 (Year: 2009).*
Machine Translation of CN 201786929 (Year: 2011).*
Machine Translation of TW-M613469 (Year: 2021).*

* cited by examiner

*Primary Examiner* — Alan B Waits
(74) *Attorney, Agent, or Firm* — INNOVATION CAPITAL LAW GROUP, LLP; Vic Lin

(57) ABSTRACT

The ball reflow component includes a ball cage, a first end cover, and a second end cover. The ball cage includes a long groove, a first recessed portions, a second recessed portions, a first side portion, and a second side portion corresponding to the first side portion. The first recessed portions and the second recessed portions are arranged on the first side portion and the second side portion, respectively. The first end cover is assembled on the first side portion. The first end cover includes a first curve and first protruding portions, and the first protruding portions are correspondingly arranged in the first recessed portions. The second end cover is assembled on the second side portion. The second end cover includes a second curve and second protruding portions, and the second protruding portions are correspondingly arranged in the second recessed portions.

16 Claims, 5 Drawing Sheets

BALL SPLINE ASSEMBLY AND BALL REFLOW COMPONENT THEREOF

CROSS-REFERENCE TO RELATED APPLICATION

This non-provisional application claims priority under 35 U.S.C. § 119(a) to Patent Application No. 202222151545.5 filed in China, P.R.C. on Aug. 16, 2022, the entire contents of which are hereby incorporated by reference.

BACKGROUND

Technical Field

The instant disclosure relates to a ball spline assembly and a ball reflow component, in particular, a ball spline assembly and a ball reflow component thereof that can be quickly aligned and assembled.

Related Art

A ball spline assembly is a linear guide device in which the outer cylinder is moved linearly on the spline shaft. Through the structure that the balls in the ball spline assembly roll in the ball groove relative to the spline shaft, the relative movement between the ball spline assembly and the spline shaft can be made smoother and the load capacity can be greatly improved. In this way, the ball spline can play an effective role in places where vibration and shock loads are large and where high-speed motion performance is required.

In a ball spline assembly known to the inventor, the ball cage of the ball reflow component does not have an axial connection structure that abuts against the cover inside the outer cylinder. Therefore, the structural stability is poorer, and the time for assembly is also increased. Moreover, if the connection structure is added, the ball spline assembly needs to be provided with other additional elements, which will lead to problems of increased volume of the assembly and production cost of additional parts.

SUMMARY

In view of this, according to one embodiment, a ball reflow component is provided and comprises a ball cage, a first end cover, and a second end cover. The ball cage comprises a long groove, a plurality of first recessed portions, a plurality of second recessed portions, a first side portion, and a second side portion corresponds to the first side portion. The plurality of first recessed portions are arranged on the first side portion, and the plurality of second recessed portions are arranged on the second side portion. The first end cover is assembled on the first side portion of the ball cage. The first end cover comprises a first curve and a plurality of first protruding portions, one of two ends of the first curve corresponds to one of two ends of the long groove, and the plurality of first protruding portions are correspondingly arranged in the plurality of first recessed portions. The second end cover is assembled on the second side portion of the ball cage. The second end cover comprises a second curve and a plurality of second protruding portions, one of two ends of the second curve corresponds to the other end of the long groove, and the plurality of second protruding portions are correspondingly arranged in the plurality of second recessed portions.

Moreover, according to one embodiment, a ball spline assembly is provided and comprises an outer cylinder, a ball cage, a first end cover, a second end cover, and a plurality of balls. The outer cylinder comprises an inner annular wall, an outer annular wall, a first end portion, and a second end portion axially corresponding to the first end portion. The outer cylinder further comprises a ball groove and a long through hole, the ball groove is axially disposed on the inner annular wall, and the long through hole is axially passes through the outer cylinder and is between the inner annular wall and the outer annular wall. The ball cage comprises a long groove. The ball cage is axially inserted into the outer cylinder, and the long groove corresponds to the ball groove. The ball cage comprises a plurality of first recessed portions, a plurality of second recessed portions, a first side portion, and a second side portion corresponding to the first side portion. The plurality of first recessed portions are arranged on the first side portion, and the plurality of second recessed portions are arranged on the second side portion. The first end cover is disposed on the first end portion of the outer cylinder. The first end cover comprises a first curve and a plurality of first protruding portions, and the plurality of first protruding portions are correspondingly arranged in the plurality of first recessed portions. The second end cover is disposed on the second end portion of the outer cylinder. The second end cover comprises a second curve and a plurality of second protruding portions, and the plurality of second protruding portions are correspondingly arranged in the plurality of second recessed portions. The ball groove corresponds to the long groove to form a ball channel. The ball channel, the first curve, the long through hole, and the second curve together form a ball circulation channel, and a plurality of balls are accommodated in the ball circulation channel.

In some embodiments, the first end cover further comprises a first inner cover and a first outer cover. The first inner cover has a first inner curve, and the first outer cover has the plurality of first protruding portions and a first outer curve. The first outer cover is axially assembled on the first inner cover, so that the first outer curve corresponds to the first inner curve to form the first curve. The second end cover further comprises a second inner cover and a second outer cover. The second inner cover has a second inner curve, and the second outer cover has the plurality of second protruding portions and a second outer curve. The second outer cover is axially assembled on the second inner cover, so that the second outer curve corresponds to the second inner curve to form the second curve.

In some embodiments, each of the plurality of first protruding portions has a first assembling portion and two first slanting portions, and the two first slanting portions are adjacently connected to the first assembling portion, respectively. Each of the plurality of first recessed portions has a first accommodation portion and two first guide portions, and the two first guide portions are adjacently connected to the first accommodation portion, respectively. When one of the first protruding portions is assembled in a corresponding one of the first recessed portions, the two first slanting portions are guided by the two first guide portions, so that the first protruding portion is moved to the first assembling portion in the axial direction to abut against the first accommodation portion.

In some embodiments, each of the plurality of second protruding portions has a second assembling portion and two second slanting portions, and the two second slanting portions are adjacently connected to the second assembling portion, respectively. Each of the plurality of second recessed portions has a second accommodation portion and two second guide portions, and the two second guide portions are adjacently connected to the second accommodation portion, respectively. When one of the second protruding portions is assembled in a corresponding one of the second recessed portions, the two second slanting portions are guided by the two second guide portions, so that the second protruding portion is moved to the second assembling portion in the axial direction to abut against the second accommodation portion.

In some embodiments, the plurality of first recessed portions and the plurality of second recessed portions are arranged around the axial direction and spaced apart from each other by the long groove.

In some embodiments, two opposite end portions of the long groove are respectively provided with a first guide groove and a second guide groove, the first guide groove is curvedly connected to the first curve, and the second guide groove is curvedly connected to the second curve.

In some embodiments, the first guide groove and the second guide groove extend in a direction deviated from a length direction of the long groove.

In some embodiments, the ball reflow component or the ball spine assembly further comprises a dustproof component, and the dustproof component is disposed on a side of the first end cover that is relatively away from the ball cage.

In some embodiments, the first end cover comprises a plurality of assembling holes arranged around the axial direction. The dustproof component comprises a plurality of assembling protruding portions arranged around the axial direction, and the dustproof component is correspondingly assembled in the plurality of assembling holes of the first end cover through the plurality of assembling protruding portions.

In some embodiments, the ball spin assembly further comprises a spline shaft axially inserted into the outer cylinder. The spline shaft comprises a shaft body and a track groove, the track groove is axially arranged on a surface of the shaft body, and the track groove corresponds to the ball groove. The ball cage comprises a first scrape portion and a second scrape portion, and the first scrape portion and the second scrape portion correspond to the long groove and disposed on the first side portion and the second side portion, respectively. The first scrape portion and the second scrape portion correspond to the track groove.

As above, according to the ball reflow component or the ball spline assembly of one or some embodiments of the instant disclosure, a protruding portion is provided on the ball cage and a recessed portion is provided on the end cover, so that the end cover can be axially assembled to the ball cage. The recessed portion is disposed inside the first end cover and the second end cover, instead of protruding from the surface of the end cover or being an additional component. Therefore, the overall volume of the ball spline assembly can be reduced, the stability of the structure can be further improved, and the time for assembly can also be reduced. In addition, the scrape portion is disposed on the ball cage, additional scrape components are not necessarily required, which also reduces the overall volume. Furthermore, the guide groove which extend curvedly on the ball cage can guide the balls to turn and enter the curve so as to increase the rolling efficiency of the balls.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
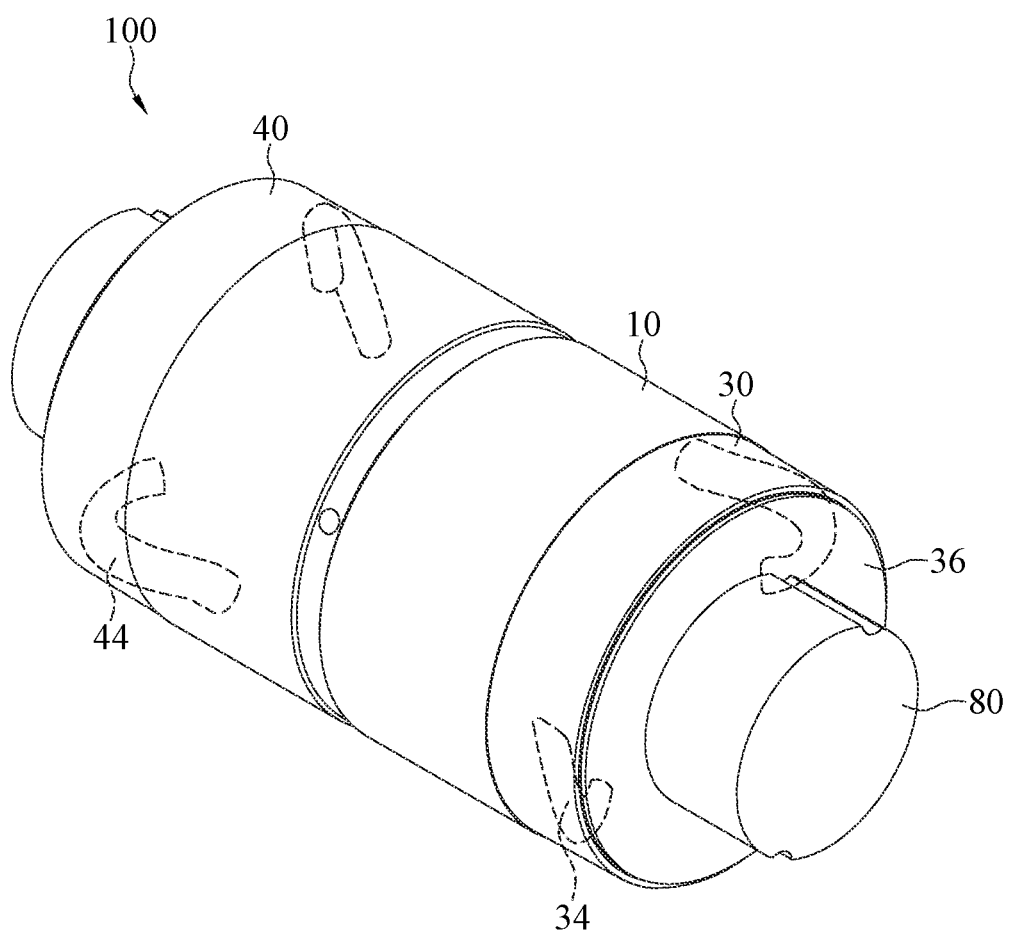
FIG. 1 illustrates a perspective view of a ball spline assembly according to an embodiment of the instant disclosure.
Figure 2:
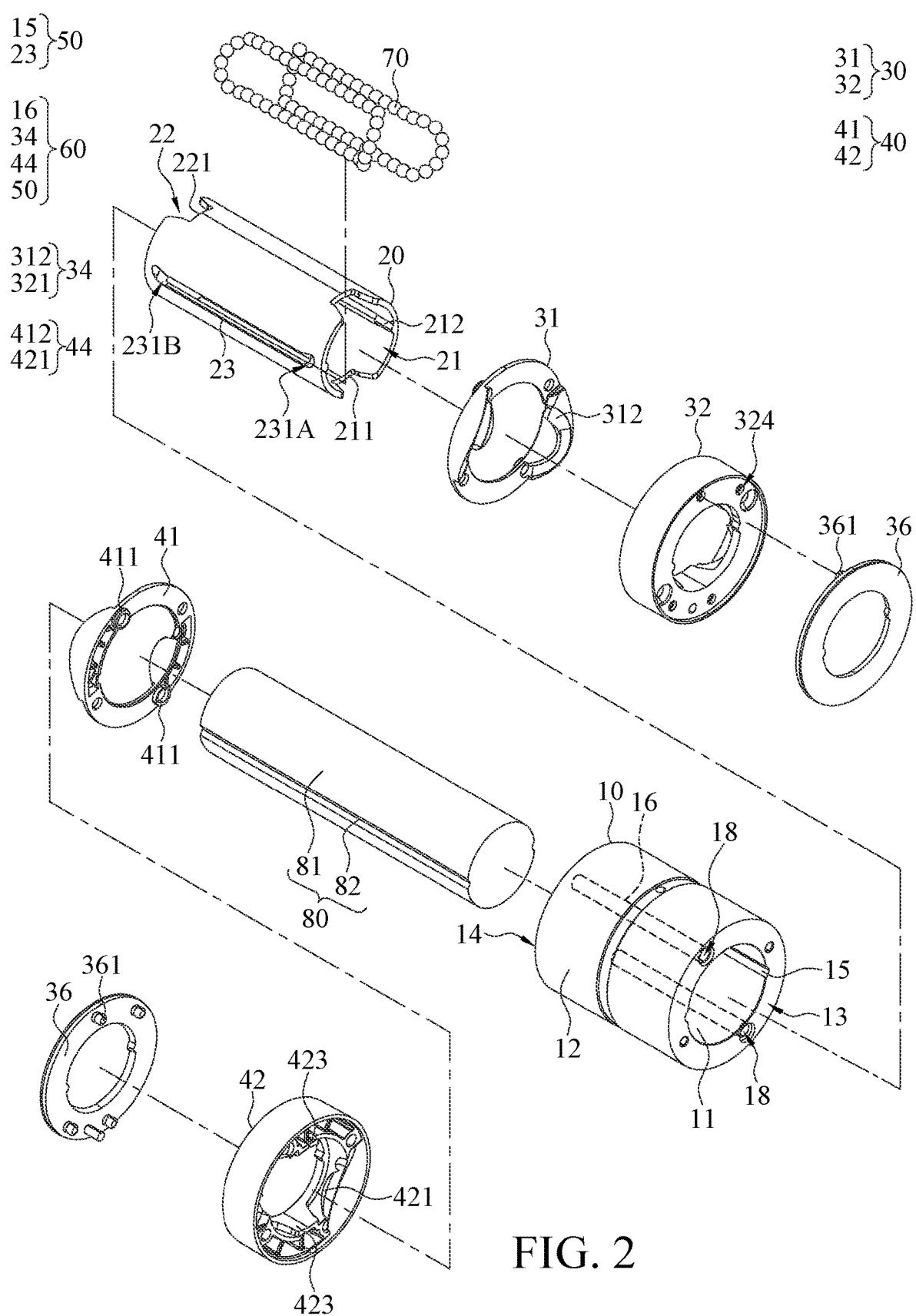
FIG. 2 illustrates an exploded view of the ball spline assembly of the embodiment of the instant disclosure.
Figure 3:
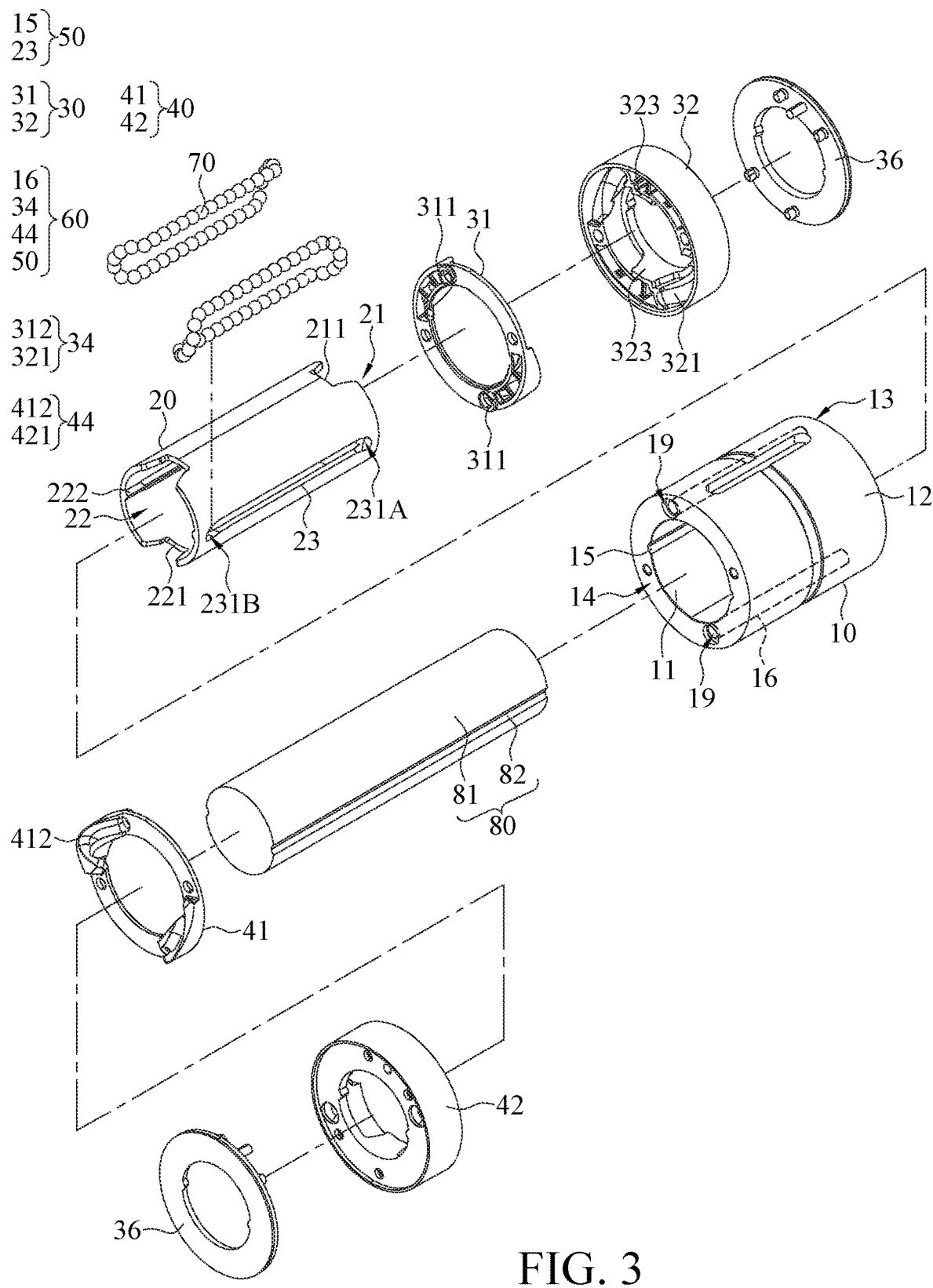
FIG. 3 illustrates an exploded view of the ball spline assembly of the embodiment of the instant disclosure from another perspective.

Please refer to FIG. 1 to FIG. 3. FIG. 1 illustrates a perspective view of a ball spline assembly according to an embodiment of the instant disclosure. FIG. 2 illustrates an exploded view of the ball spline assembly of the embodiment of the instant disclosure. FIG. 3 illustrates an exploded view of the ball spline assembly of the embodiment of the instant disclosure from another perspective. As shown in FIG. 1 and FIG. 2, the ball spline assembly 100 includes an outer cylinder 10, a ball reflow component, and a plurality of balls 70. The ball reflow component includes a ball cage 20, a first end cover 30, and a second end cover 40.

As shown in FIG. 2 and FIG. 3, the outer cylinder 10 includes an inner annular wall 11, an outer annular wall 12, a first end portion 13, and a second end portion 14 axially corresponding to the first end portion 13. The outer cylinder 10 further includes two ball grooves 15 and two long through holes 16. In this embodiment, for illustrative purposes, the number of the ball grooves 15 is two and the number of the long through holes 16 is two, but the instant disclosure is not limited thereto. In some other embodiments, the outer cylinder 10 may comprise only one ball groove 15 and only one long through hole 16, or the outer cylinder 10 may comprise one or more of the ball grooves 15, one or more of the long through holes 16, or any combination thereof.

As shown in FIG. 2, the two ball grooves 15 are axially disposed on the inner annular wall 11. In this embodiment, the two ball grooves 15 are axially disposed on the inner annular wall 11 and extend from the first end portion 13 to the second end portion 14 of the outer cylinder 10. It should be noted that, the two ball grooves 15 can be arranged on the inner annular wall 11 and spaced apart from each other equiangularly or can be arranged on the inner annular wall 11 and spaced apart from each other unequiangularly, but the instant disclosure is not limited thereto.

Moreover, as shown in FIG. 3, the two long through holes 16 axially pass through the outer cylinder 10 and between the inner annular wall 11 and the outer annular wall 12, and the two long through holes 16 pass through the outer cylinder 10 from the first end portion 13 to the second end portion 14. The positions of the two long trough holes 16 on the outer cylinder 10 can be spaced from each other equiangularly or unequalangularly. In this embodiment, the number of the long through holes 16 corresponds to the number of the ball grooves 15, and each of the long through holes 16 is correspondingly disposed adjacent to a corresponding one of the ball grooves 15.

In this embodiment, the ball cage 20 includes two long grooves 23. Likewise, for illustrative purposes, the number of the long grooves 23 is two, but the instant disclosure is not limited thereto. In some other embodiments, the ball cage 20 may comprise only one long groove 23, or the ball cage 20 may comprise one or more of the long grooves 23. The ball cage 20 is axially inserted into the outer cylinder 10, and the two long grooves 23 correspond to the two ball grooves 15.

When the ball cage 20 is inserted into the outer cylinder 10, the two long grooves 23 of the ball cage 20 correspond to the two ball grooves 15 of the inner annular wall 11 of the outer cylinder 10, respectively. In this way, each of the ball grooves 15 corresponds to a corresponding one of the long grooves 23 to form a ball channel 50.

In this embodiment, the ball cage 20 includes two first recessed portions 211, two second recessed portions 221, a first side portion 21, and a second side portion 22 corresponding to the first side portion 21. The two first recessed portions 211 are arranged on the first side portion 21, and the two second recessed portions 221 are arranged on the second side portion 22. In this embodiment, for illustrative purposes, the number of the first recessed portions 211 is two and the number of the second recessed portions 221 is two, but the instant disclosure is not limited thereto. In some other embodiments, the ball cage 20 may comprise one or more of the first recessed portions 211 and one second recessed portion 221.

As shown in FIG. 1 to FIG. 3, the first end cover 30 is disposed on the first end portion 13 of the outer cylinder 10 and assembled on the first side portion 21 of the ball cage 20. The first end cover 30 includes a first curve 34 and two first protruding portions 323. One of two ends of the first curve 34 corresponds to one of two ends of the long groove 23, and the two first protruding portions 323 are correspondingly arranged in the two first recessed portions 211. The configuration of the second end cover 40 is similar to the configuration of the first end cover 30; as shown in FIG. 1 to FIG. 3, the second end cover 40 is disposed on the second end portion 14 of the outer cylinder 10 and assembled on the second side portion 22 of the ball cage 20. The second end cover 40 includes a second curve 44 and two second protruding portions 423. One of two ends of the second curve 44 corresponds to one of two ends of the long groove 23, and the two second protruding portions 423 are correspondingly arranged in the two second recessed portions 221. In this embodiment, the numbers of the first protruding portions 323 and the second protruding portions 423 correspond to the numbers of the first recessed portions 211 and the second recessed portions 221, respectively.

After the assembling of the components are finished, the ball channel 50, the first curve 34, the long through hole 16, and the second curve 44 together form a ball circulation channel 60. That is, in this embodiment, two ball circulation channels 60 are formed. The plurality of balls 70 are accommodated in the ball circulation channel 60. In this embodiment, for illustrative purposes, as shown in FIG. 2 and FIG. 3, two sets of balls 70 are accommodated in two ball circulation passages 60. In practice, multiple sets of balls 70 may be provided corresponding to each of the ball circulation channels 60, respectively, for example, the number of the sets of balls 80 may be 2, 3 or 4. In addition, the number of ball circulation channels 60 is also possible to be increased to correspond to the number of sets of balls 70, for example, the number of the sets of ball circulation passages may be 6, 8, or more.

Specifically, in this embodiment, the protruding portion is provided on the ball cage 20 and the recessed portion is provided on the first end cover 30 and the second end cover 40, so that the first end cover 30 and second end cover 40 can be axially assembled to the ball cage 20. The recessed portion is disposed inside the first end cover 30 and the second end cover 40, instead of protruding from the surface of the end cover or being, an additional component. Therefore, the overall volume of the ball spline assembly 100 can be reduced, the stability of the structure can be further improved, and the time for assembly can also be reduced. In addition, in some other embodiments, since the ball cage 20, the first end cover 30 and the second end cover 40 are the ball reflow component of the ball spline assembly 100, the ball reflow component can also be applied to ball spline assemblies with different configurations.

In this embodiment, the outer cylinder 10 includes two first fixing holes 18 and two second fixing holes 19. For illustrative purposes, the number of the first fixing holes 18 is two and the number of the second fixing holes 19 is two, but the instant disclosure is not limited thereto. As shown in FIG. 2 and FIG. 3, the two first fixing holes 18 are disposed on the first end portion 13, and the two second fixing holes 19 are disposed on the second end portion 14. In addition, the first end cover 30 further includes a first inner cover 31 and a first outer cover 32. The first inner cover 31 has two first fixing portions 311 and a first inner curve 312. As described above, for illustrative purposes, the number of the first fixing portions 311 is two, but the instant disclosure is not limited thereto. In some other embodiments, the first inner cover 31 may comprise two or more first fixing portions 311. The two first fixing portions 311 are closely mated with the two first fixing holes 18 of the outer cylinder 10.

As shown in FIG. 2 and FIG. 3, the first outer cover 32 has a first outer curve 321. The first outer cover 32 is axially assembled on the first inner cover 31, so that the first outer curve 321 corresponds to the first inner curve 312 to form the first curve 34 (as shown FIG. 1).

In this embodiment, the two first protruding portions 323 are disposed on the first outer cover 32 of the first end cover 30 so as to be correspondingly assembled with the two first recessed portions 211. The detailed structures of the first protruding portions 323 and the first recessed portions 211 will be described later.

The configuration of the second end cover 40 is similar to the configuration of the first end cover 30. As shown in FIG. 2 and FIG. 3, the second end cover 40 includes a second inner cover 41 and a second outer cover 42. The second inner cover 41 has two second fixing portions 411 and a second inner curve 412. As described above, for illustrative purposes, the number of the second fixing portions 411 is two, but the instant disclosure is not limited thereto. In some other embodiments, the second inner cover 41 may comprise two or more second fixing portions 411. The two second fixing portions 411 are closely mated with the two second fixing holes 19 of the outer cylinder 10.

The second outer cover 42 has a second outer curve 421. The second outer cover 42 is axially assembled on the second inner cover 41, so that the second outer curve 421 corresponds to the second inner curve 412 to form the second curve 44 (as shown FIG. 1).

In this embodiment, the two second protruding portions 423 are disposed on the second outer cover 42 of the second end cover 40 to be correspondingly assembled with the two second recessed portions 221. The detailed structures of the second protruding portions 423 and the second recessed portions 221 will be described later.

In this way, the outer cover can be quickly assembled through assembling the protruding portions and the recessed portions with each other. When the balls 70 inside the assembly are worn after long-term use, the first outer cover 32 of the first end portion 13 or the second outer cover 42 of the second end portion 14 can be removed. Next, after the balls 70 are poured out of the assembly, new balls 70 are filled in the assembly. In this way, the ball spline assembly 100 can be used again without purchasing a brand-new ball spline assembly 100.

Figure 4:
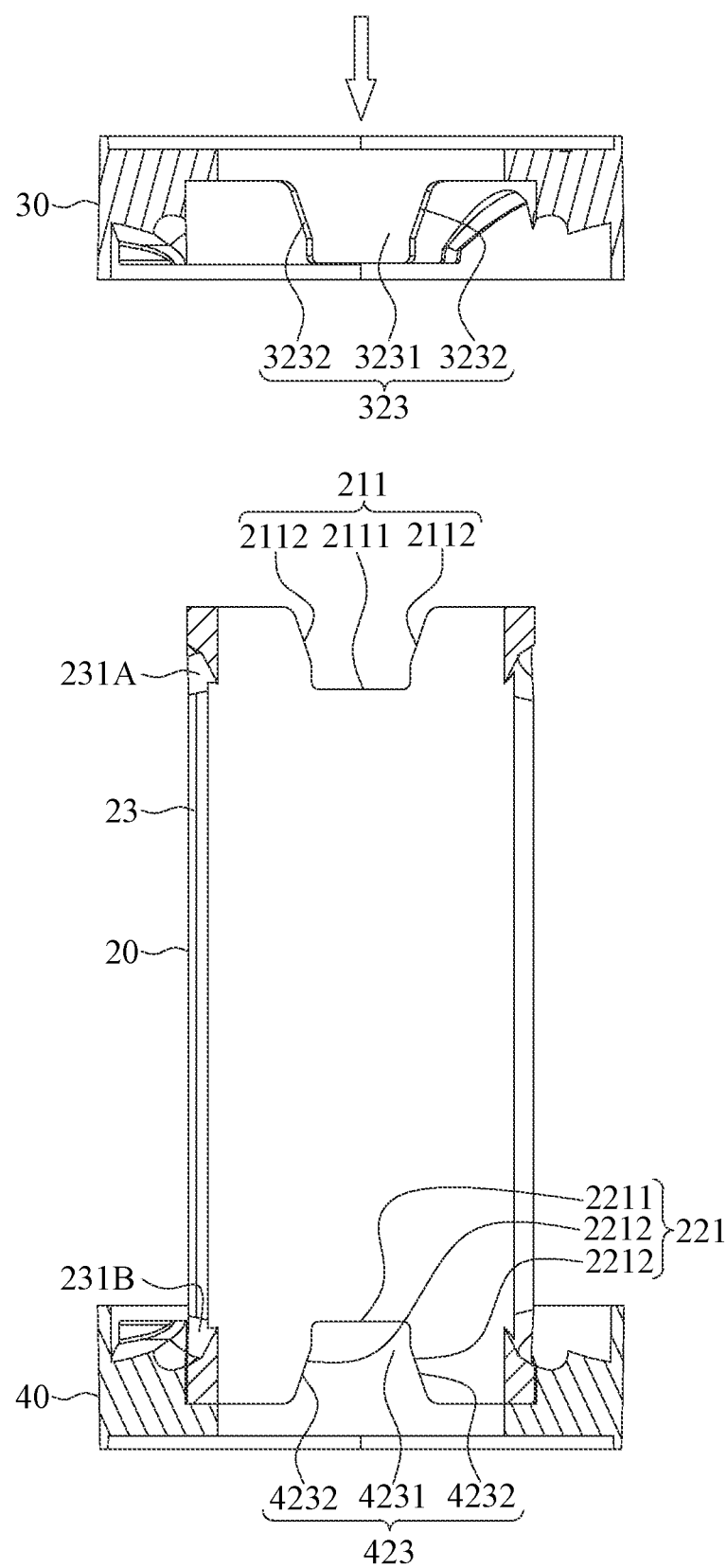
FIG. 4 illustrates a schematic assembled view of a ball reflow component of the ball spline assembly of the embodiment of the instant disclosure.

For the detailed structures of the first protrusion 323, the first recessed portions 211, the second protruding portions 423 and the second recessed portions 221, please refer to FIG. 4. FIG. 4 illustrates a schematic assembled view of a ball reflow component of the ball spline assembly of the embodiment of the instant disclosure. In this embodiment, the first end cover 30 is taken as an example for illustration, and the configuration of the second end cover 40 which is similar to the configuration of the first end cover 30 will not be repeated. As shown FIG. 4, the first protruding portion 323 has a first assembling portion 3231 and two first slanting portions 3232, and the two first slanting portions 3232 are adjacently connected to the first assembling portion 3231, respectively. The first recessed portion 211 has a first accommodation portion 2111 and two first guide portions 2112, and the two first guide portions 2112 are adjacently connected to the first accommodation portion 2111, respectively. The second protruding portion 423 has a second assembling portion 4231 and two second slanting portions 4232, and the two second slanting portions 4232 are adjacently connected to the second assembling portion 4231, respectively. The second recessed portion 221 has a second accommodation portion 2211 and two second guide portions 2212, and the two second guide portions 2212 are adjacently connected to the second accommodation portion 2211, respectively. In this embodiment, when the first protruding portion 323 is correspondingly assembled in the first recessed portion 211, the two first slanting portions 3232 are guided by the two first guide portions 2112, so that the first protruding portion 323 is moved to the first assembling portion 3231 in the axial direction to abut against the first accommodation portion 2111. The second end cover 40 on the other side of the outer cylinder 10 is also assembled in the same manner. In this way, the ball cage 20, the first end cover 30, and the second end cover 40 can be quickly assembled, and the structural stability of the ball cage 20 in the axial direction is improved.

Please refer to FIG. 2 and FIG. 3 again. In this embodiment, the two first recessed portions 211 and the two second recessed portions 221 are arranged around the axial direction and spaced apart from each other by the long groove 23, but the instant disclosure is not limited thereto. In this embodiment, the first recessed portions 211 is taken as an example, the long groove 23 may not be provided between the two first recessed portions 211. That is to say, in this embodiment, the two first recessed portions 211 are disposed between the two long groove 23. Alternatively, in some embodiments, when the number of the first recessed portions 211 is three, two of the first recessed portions 211 or one of the first recessed portions 211 may be disposed between the two long groove 23.

Figure 5:
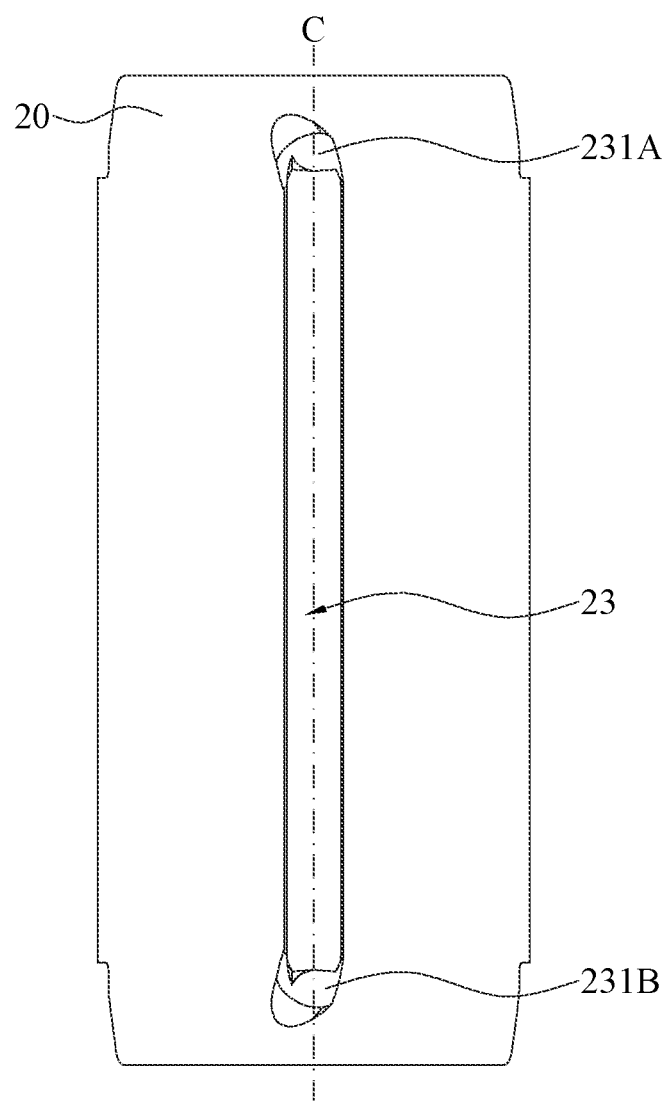
FIG. 5 illustrates a schematic view of a ball cage of the embodiment of the instant disclosure from another perspective.

Please refer to FIG. 1, FIG. 4, and FIG. 5. FIG. 5 illustrates a schematic view of a ball cage of the embodiment of the instant disclosure from another perspective. In this embodiment, two opposite end portions of the long groove 23 are respectively provided with a first guide groove 231A and a second guide groove 231B, the first guide groove 231A curvedly extend to the first curve 34, and the second guide groove 231B curvedly extend to the second curve 44. In this way, the plurality of balls 70 are guided to the first curve 34 and the second curve 44, respectively. As shown in FIG. 4, the first guide grooves 231A and the second guide grooves 231B curvedly extend toward the outer side direction. In addition, in this embodiment, the first guide groove 231A and the second guide groove 231B extend in a direction deviated from a length direction of the long groove 23. As shown in FIG. 5, the length direction of the long groove 23 is along the direction of the central axis C, while the first guiding groove 231A and the second guiding groove 231B extend in a direction deviated from the central axis C. Through the first guide groove 231A and the second guide groove 231B that curvedly extend toward the laterally and outwardly, the balls 70 can be guided to turn into the curve in the end cover earlier, so as to increase the rolling efficiency of the ball 70. Further, due to the first guide groove 231A and the second guide groove 231B, the ball 70 can turn early. In this way, the length of the curve provided in the end cover for turning can be reduced, thereby reducing the volume of the end cover. In addition, the rolling stroke of the ball 70 in the ball spline assembly 100 is increased through the first guide groove 231A and the second guide groove 231B, so that the ball spline assembly 100 can move more smoothly.

As shown in FIG. 2 and FIG. 3, in this embodiment, the ball spline assembly 100 further includes a dustproof component 36 disposed on a side of the first end cover 30 that is relatively away from the ball cage 20. As shown in FIG. 2 and FIG. 3, the first outer cover 32 of the first end cover 30 includes four assembling holes 324 arranged around the axial direction. The dustproof component 36 includes four assembling protruding portions 361 arranged around the axial direction, and the dustproof component 36 is correspondingly assembled in the four assembling holes 324 of the first outer cover 32 through the four assembling protruding portions 361. In this embodiment, for illustrative purposes, the number of the assembling holes 324 corresponds to the number of the assembling protruding portions 361, and the number of the assembling holes 324 is four and the number of the assembling protruding portions 361 is four, but the instant disclosure is not limited thereto. In some other embodiments, the dustproof component 36 may also be fixed on the first outer cover 32 of the first end cover 30 through screws. In addition, the dustproof component 36 can also be disposed on the second outer cover 42, and descriptions for the similar structure will not be repeated here.

In addition, as shown in FIG. 2 and FIG. 3, the ball spline assembly 100 further includes a spline shaft 80 axially inserted into the outer cylinder 10. The spline shaft 80 includes a shaft body 81 and two track grooves 82, the two track grooves 82 are axially arranged on a surface of the shaft body 81, and the two track grooves 82 correspond to the two long grooves 23 of the ball cage 20. The number of the elements here are just provided as examples, but the instant disclosure is not limited thereto.

Figure 6:
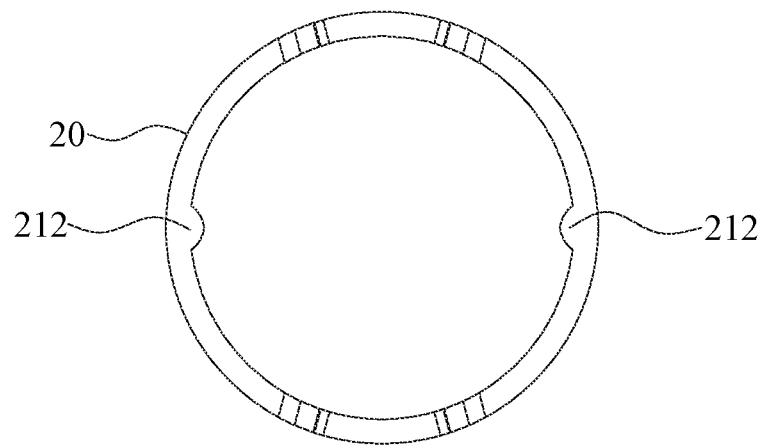
FIG. 6 illustrates a front view of the ball cage of the embodiment of the instant disclosure.

Furthermore, please refer to FIG. 2, FIG. 3, and FIG. 6. FIG. 6 illustrates a front view of the ball cage of the embodiment of the instant disclosure. In this embodiment, the ball cage 20 includes a first scrape portion 212 and a second scrape portion 222, the first scrape portion 212 and the second scrape portion 222 correspond to the long groove 23 and disposed on the first side portion 21 and the second side portion 22, respectively. The first scrape portion 212 and the second scrape portion 222 correspond to the track groove 82. As shown in FIG. 6, the first scrape portion 212 is taken as an example, the first scrape portion 212 protrudes from the inner wall of the ball cage 20 to correspond to the track groove 82 to achieve the function of scraping foreign matter or dust. In addition, through the first scrape portion 212 and the second scrape portion 222 protruding from the inner wall of the ball cage 20, additional scrape components are not necessarily required, and the overall volume of the ball spline assembly 100 can also be reduced.

As above, according to the ball reflow component or the ball spline assembly of one or some embodiments of the instant disclosure, through assembling the recessed portions of the ball cage and the protruding portions of the end cover with each other, the ball cage can be assembled on the end cover. In this way, the ball cage and the end cover can be assembled without additional connecting elements, which reduces the volume of the ball spline assembly. Furthermore, the stability of the structure can also be improved, and the time for assembly can be reduced. In addition, through the scrape portion protruding from the inner wall of the ball cage, additional scrape components are no necessarily require, and the overall volume of the ball spline assembly can also be reduced. Through the guide groove is curvedly extended, the balls can move along the guide grooves which extend curvedly and turn into the curve early to increase the rolling efficiency of the balls. Further, since the guide groove guides the ball to turn earlier, the end cover can omit part of the curve structure, so as to reduce the volume of the end cover. In addition, the guide groove increases the rolling stroke of the balls in the ball spline assembly, so that the ball spline assembly can move more smoothly.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A ball reflow component adapted to a ball spline assembly, wherein the ball reflow component comprises:
   a ball cage comprising a groove, a plurality of first recessed portions, a plurality of second recessed portions, a first side portion, and a second side portion opposite to the first side portion, wherein the plurality of first recessed portions are arranged on the first side portion, and the plurality of second recessed portions are arranged on the second side portion;
   a first end cover assembled on the first side portion of the ball cage, wherein the first end cover comprises a first curve and a plurality of first protruding portions, one of two ends of the first curve corresponds to one of two ends of the groove, and the plurality of first protruding portions are correspondingly arranged in the plurality of first recessed portions; and
   a second end cover assembled on the second side portion of the ball cage, wherein the second end cover comprises a second curve and a plurality of second protruding portions, one of two ends of the second curve corresponds to the other end of the groove, and the plurality of second protruding portions are correspondingly arranged in the plurality of second recessed portions;
   wherein two opposite end portions of the groove are respectively provided with a first guide groove and a second guide groove, the first guide groove is curvedly connected to the first curve, and the second guide groove is curvedly connected to the second curve;
   wherein the first guide groove and the second guide groove extend in a direction deviated from a length direction of the groove.

2. The ball reflow component according to claim 1, wherein the first end cover further comprises a first inner cover and a first outer cover; the first inner cover has a first inner curve, the first outer cover has the plurality of first protruding portions and a first outer curve; the first outer cover is axially assembled on the first inner cover, so that the first outer curve corresponds to the first inner curve to form the first curve; the second end cover further comprises a second inner cover and a second outer cover; the second inner cover has a second inner curve, the second outer cover has the plurality of second protruding portions and a second outer curve; the second outer cover is axially assembled on the second inner cover, so that the second outer curve corresponds to the second inner curve to form the second curve.

3. The ball reflow component according to claim 1, wherein each of the plurality of first protruding portions has a first assembling portion and two first slanting portions, and the two first slanting portions are adjacently connected to the first assembling portion, respectively; each of the plurality of first recessed portions has a first accommodation portion and two first guide portions, and the two first guide portions are adjacently connected to the first accommodation portion, respectively; when one of the first protruding portions is assembled in a corresponding one of the first recessed portions, the two first slanting portions are guided by the two first guide portions, so that the first protruding portion is moved to the first assembling portion in the axial direction to abut against the first accommodation portion.

4. The ball reflow component according to claim 3, wherein each of the plurality of second protruding portions has a second assembling portion and two second slanting portions, and the two second slanting portions are adjacently connected to the second assembling portion, respectively; each of the plurality of second recessed portions has a second accommodation portion and two second guide portions, and the two second guide portions are adjacently connected to the second accommodation portion, respectively; when one of the second protruding portions is assembled in a corresponding one of the second recessed portions, the two second slanting portions are guided by the two second guide portions, so that the second protruding portion is moved to the second assembling portion in the axial direction to abut against the second accommodation portion.

5. The ball reflow component according to claim 1, wherein the plurality of first recessed portions and the plurality of second recessed portions are arranged around the axial direction and spaced apart from each other by the groove.

6. The ball reflow component according to claim 1, further comprising a dustproof component disposed on a side of the first end cover that is relatively away from the ball cage.

7. The ball reflow component according to claim 6, wherein the first end cover comprises a plurality of assembling holes arranged around the axial direction; the dustproof component comprises a plurality of assembling protruding portions arranged around the axial direction, and the dustproof component is correspondingly assembled in the plurality of assembling holes of the first end cover through the plurality of assembling protruding portions.

8. The ball reflow component according to claim 1, wherein the ball cage comprises a first scrape portion and a second scrape portion, the first scrape portion and the second scrape portion correspond to the groove and disposed on the first side portion and the second side portion, respectively.

9. A ball spline assembly, comprising:
an outer cylinder comprising an inner annular wall, an outer annular wall, a first end portion, and a second end portion axially corresponding to the first end portion, wherein the outer cylinder further comprises a ball groove and a through hole, the ball groove is axially disposed on the inner annular wall, and the through hole is axially passed through the outer cylinder and is between the inner annular wall and the outer annular wall;
a ball cage comprising a groove, wherein the ball cage is axially inserted into the outer cylinder, and the groove corresponds to the ball groove; the ball cage comprises a plurality of first recessed portions, a plurality of second recessed portions, a first side portion, and a second side portion opposite to the first side portion, the plurality of first recessed portions are arranged on the first side portion, and the plurality of second recessed portions are arranged on the second side portion;
a first end cover disposed on the first end portion of the outer cylinder, wherein the first end cover comprises a first curve and a plurality of first protruding portions, the plurality of first protruding portions are correspondingly arranged in the plurality of first recessed portions;
a second end cover disposed on the second end portion of the outer cylinder, wherein the second end cover comprises a second curve and a plurality of second protruding portions, the plurality of second protruding portions are correspondingly arranged in the plurality of second recessed portions; and
a plurality of balls, wherein the ball groove corresponds to the groove to form a ball channel, the ball channel, the first curve, the through hole, and the second curve together form a ball circulation channel, and the plurality of balls are accommodated in the ball circulation channel;
wherein two opposite end portions of the groove are respectively provided with a first guide groove and a second guide groove, the first guide groove is curvedly connected to the first curve, and the second guide groove is curvedly connected to the second curve;
wherein the first guide groove and the second guide groove extend in a direction deviated from a length direction of the groove.

10. The ball spline assembly according to claim 9, wherein the first end cover further comprises a first inner cover and a first outer cover; the first inner cover has a first inner curve, the first outer cover has the plurality of first protruding portions and a first outer curve; the first outer cover is axially assembled on the first inner cover, so that the first outer curve corresponds to the first inner curve to form the first curve; the second end cover further comprises a second inner cover and a second outer cover; the second inner cover has a second inner curve, the second outer cover has the plurality of second protruding portions and a second outer curve; the second outer cover is axially assembled on the second inner cover, so that the second outer curve corresponds to the second inner curve to form the second curve.

11. The ball spline assembly according to claim 9, wherein each of the plurality of first protruding portions has a first assembling portion and two first slanting portions, and the two first slanting portions are adjacently connected to the first assembling portion, respectively; each of the plurality of first recessed portions has a first accommodation portion and two first guide portions, and the two first guide portions are adjacently connected to the first accommodation portion, respectively; when one of the first protruding portions is assembled in a corresponding one of the first recessed portions, the two first slanting portions are guided by the two first guide portions, so that the first protruding portion is moved to the first assembling portion in the axial direction to abut against the first accommodation portion.

12. The ball spline assembly according to claim 11, wherein each of the plurality of second protruding portions has a second assembling portion and two second slanting portions, and the two second slanting portions are adjacently connected to the second assembling portion, respectively; each of the plurality of second recessed portions has a second accommodation portion and two second guide portions, and the two second guide portions are adjacently connected to the second accommodation portion, respectively; when one of the second protruding portions is assembled in a corresponding one of the second recessed portions, the two second slanting portions are guided by the two second guide portions, so that the second protruding portion is moved to the second assembling portion in the axial direction to abut against the second accommodation portion.

13. The ball spline assembly according to claim 9, wherein the plurality of first recessed portions and the plurality of second recessed portions are arranged around the axial direction and spaced apart from each other by the groove.

14. The ball spline assembly according to claim 9, further comprising a dustproof component disposed on a side of the first end cover that is relatively away from the ball cage.

15. The ball spline assembly according to claim 14, wherein the first end cover comprises a plurality of assembling holes arranged around the axial direction; the dustproof component comprises a plurality of assembling protruding portions arranged around the axial direction, and the dustproof component is correspondingly assembled in the plurality of assembling holes of the first end cover through the plurality of assembling protruding portions.

16. The ball spline assembly according to claim 9, further comprising a spline shaft axially inserted into the outer cylinder, wherein the spline shaft comprises a shaft body and a track groove, the track groove is axially arranged on a surface of the shaft body, and the track groove corresponds to the ball groove; the ball cage comprises a first scrape portion and a second scrape portion, the first scrape portion and the second scrape portion correspond to the groove and disposed on the first side portion and the second side portion, respectively; the first scrape portion and the second scrape portion correspond to the track groove.

* * * * *